United States Patent
Otsuka

(10) Patent No.: US 6,205,776 B1
(45) Date of Patent: Mar. 27, 2001

(54) AIR-FUEL RATION CONTROL SYSTEM FOR MULTI-CYLINDER INTERNAL COMBUSTION ENGINE

(75) Inventor: Kaoru Otsuka, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/253,440

(22) Filed: Feb. 19, 1999

(30) Foreign Application Priority Data

Feb. 24, 1998 (JP) .................................................. 10-042417

(51) Int. Cl.$^7$ ...................................................... F01N 3/00
(52) U.S. Cl. .............................. 60/285; 60/284; 60/276; 60/274; 123/492; 123/692; 123/673
(58) Field of Search .............................. 60/284, 285, 276, 60/274; 123/492, 673, 692; 364/431.05

(56) References Cited

U.S. PATENT DOCUMENTS

| | | | |
|---|---|---|---|
| 4,964,271 | * 10/1990 | Sawada et al. | 60/274 |
| 5,363,648 | * 11/1994 | Akazaki et al. | 60/276 |
| 5,429,104 | * 7/1995 | Kondou | 123/692 |
| 5,566,071 | * 10/1996 | Akazaki et al. | 364/431.05 |
| 5,655,362 | * 8/1997 | Kawajiri et al. | 60/276 |
| 5,715,796 | * 2/1998 | Suzuki et al. | 123/492 |
| 5,730,111 | * 3/1998 | Kaji et al. | 123/673 |
| 5,732,689 | * 3/1998 | Ohmo et al. | 123/673 |
| 5,758,490 | * 6/1998 | Maki et al. | 60/274 |
| 5,758,491 | * 6/1998 | Augustin et al. | 60/274 |
| 5,845,492 | * 12/1998 | Isobe et al. | 60/284 |

FOREIGN PATENT DOCUMENTS

| | | | |
|---|---|---|---|
| 62-178740 | 8/1987 | (JP) . | |
| 63-18154 | * 1/1988 | (JP) | 123/692 |
| 2-99240 | 8/1990 | (JP) . | |
| 7-83148 | 3/1995 | (JP) . | |
| 8-226341 | 9/1996 | (JP) . | |
| 9-96216 | 4/1997 | (JP) . | |
| 410205374 | * 8/1998 | (JP) . | |

* cited by examiner

Primary Examiner—Thomas Denion
Assistant Examiner—Thai Ba Trieu
(74) Attorney, Agent, or Firm—Kenyon & Kenyon

(57) ABSTRACT

An air-fuel ratio control system for a multi-cylinder internal combustion engine is equipped with an exhaust emission control catalyst disposed in an exhaust passage of the engine, air-fuel ratio control means for controlling an air-fuel ratio of at least one of the plurality of cylinders, and an exhaust gas temperature sensor operating as catalyst temperature detection. During a cold start of the engine, the air-fuel ratio control means achieves one of rich-state and stoichiometric operation in all of the cylinders until the temperature of the exhaust emission control catalyst reaches a predetermined temperature. After the temperature of the exhaust emission control catalyst has reached the predetermined temperature, the air-fuel ratio control means starts lean-state operation in a first portion of the plurality of cylinders while maintaining rich-state operation in a second portion of the plurality of cylinders.

16 Claims, 10 Drawing Sheets

AIR-FUEL RATION CONTROL SYSTEM FOR MULTI-CYLINDER INTERNAL COMBUSTION ENGINE

INCORPORATION BY REFERENCE

The disclosure of Japanese Patent Application No. HEI 10-42417 filed on Feb. 24, 1998 including the specification, drawings and abstract are incorporated herein by reference in its entirety.

BACKGROUND OF THE INVENTION

1. Field of the Invention

The present invention relates to an air-fuel ratio control system for a multi-cylinder internal combustion engine and, more particularly, relates to an air-fuel ratio control system that is employed in a multi-cylinder internal combustion engine and is designed to reduce an amount of fuel injected into some cylinders during engine start and to activate a catalyst at an early stage.

2. Description of the Related Art

According to a conventionally employed control method intended to activate a catalyst at an early stage, fuel injection into some cylinders of a multi-cylinder internal combustion engine is stopped during a cold start thereof. Thus, exhaust gas that is discharged from those cylinders is supplied to a catalytic converter as secondary air, which exhibits a high concentration of oxygen and contains no fuel at all. As a result, the catalyst is urged to further promote reactions for oxidizing HC and CO.

For example, Japanese Patent Application Laid-Open No. HEI 7-83148 discloses an art intended to activate a catalyst at an early stage while maintaining good idling stability. According to this art, during cold start of a multi-cylinder internal combustion engine with a plurality of cylinders, some of those cylinders are subjected to rich-state operation wherein the air-fuel ratio assumes a value on the rich side, and other cylinders are subjected to lean-state operation wherein the air-fuel ratio assumes a value on the lean side. Lean-state operation of those cylinders is accomplished by either reducing an amount of is fuel injected thereto or completely stopping fuel injection thereto. While the ignition timing is retarded with respect to those cylinders which are to be subjected to rich-state operation, it is advanced with respect to those cylinders which are to be subjected to lean-state operation. These ignition timing correcting operations are alternately performed in each of the cylinders.

However, according to the air-fuel ratio control system for the multi-cylinder internal combustion engine disclosed in Japanese Patent Application Laid-Open No. HEI 7-83148, some of the cylinders undergo lean-state operation, which results in a drop in temperature of an exhaust system. Hence, it takes a long time for the catalyst to reach a temperature at which the catalyst starts to be activated (hereinafter referred to as an activation start temperature), that is, a temperature at which the catalyst temperature starts rising sharply (hereinafter referred to as a catalytic reaction promoting temperature).

SUMMARY OF THE INVENTION

It is thus an object of the present invention to provide an air-fuel ratio control system that is installed in a multi-cylinder internal combustion engine and is capable of solving the aforementioned problem and activating a catalyst at an early stage by reducing an amount of fuel injected into some cylinders.

An air-fuel ratio control system according to the present invention is applied to a multi-cylinder internal combustion engine that has a plurality of cylinders. This air-fuel ratio control system is provided with an exhaust emission control catalyst disposed in an exhaust passage of the internal combustion engine, air-fuel ratio control means for controlling an air-fuel ratio of at least one of the plurality of cylinders, and catalyst temperature detection means for detecting a temperature of the exhaust emission control catalyst. If the temperature of the exhaust emission control catalyst is lower than a first predetermined temperature, the air-fuel ratio control means reduces an upper limit of an air fuel ratio for at least one cylinder of the plurality of cylinders, in comparison with an upper limit of the air-fuel ratio for the at least one cylinder used if the temperature of the exhaust emission control catalyst is equal to or higher than the first predetermined temperature. Furthermore, during cold start of the internal combustion engine, the air-fuel ratio control means achieves rich-state operation or stoichiometric operation in all the cylinders until the temperature of the exhaust emission control catalyst detected by the exhaust gas temperature sensor reaches a first predetermined temperature. After the temperature of the exhaust emission control catalyst exceeds the first predetermined temperature, the air-fuel ratio control means controls air-fuel ratios in the respective cylinders in such a manner as to achieve lean-state operation in a first portion of the plurality of cylinders and rich-state operation in a second portion of the plurality of cylinders.

In the aforementioned construction, an increased amount of fuel is injected into all the cylinders with a view to warming up the engine, until the exhaust emission control catalyst reaches an activation start temperature. After the exhaust emission control catalyst reaches the activation start temperature, the first portion of the plurality of cylinders start undergoing lean-state operation and the second portion of the plurality of cylinders start undergoing rich-state operation. Therefore, the time period required to complete a warm-up process of the exhaust emission control catalyst after engine start is shortened.

In the air-fuel ratio control system for the multi-cylinder internal combustion engine according to the present invention, the air-fuel ratio control means may gradually increase the number of cylinders included in the first portion of the plurality of cylinders in accordance with an operational state of the internal combustion engine.

In this case, when the exhaust emission control catalyst reaches the activation start temperature, the aforementioned air-fuel ratio control means gradually increases the number of cylinder included in the first portion of the plurality of cylinders, instead of simultaneously starting lean-state operation of a plurality of cylinders. Accordingly, the temperature of the exhaust emission control catalyst is prevented from dropping due to an abrupt inflow of secondary air therein, and the time period required to complete a warm-up process of the exhaust emission control catalyst after engine start is reduced.

In the air-fuel ratio control system for the multi-cylinder internal combustion engine according to the present invention, the air-fuel ratio control means may reduce the number of cylinders included in the first portion of the plurality of cylinders when the temperature of the exhaust emission control catalyst detected by the catalyst temperature detection means reaches a second predetermined temperature.

In this case, the aforementioned air-fuel ratio control means reduces the number of cylinders included in the first portion of the plurality of cylinders when the exhaust emission control catalyst reaches the second predetermined temperature, wherein maintaining the catalyst below the second predetermined temperature prevents the exhaust emission control catalyst from becoming overheated and deteriorating in performance. Thus, the exhaust emission control catalyst is prevented from becoming overheated and deteriorating in performance.

Further, the air-fuel ratio control system for the multi-cylinder internal combustion engine according to the present invention may be provided with fuel injection amount correction means for correcting an amount of fuel injected into cylinders under rich-state operation in accordance with an amount of air that is discharged from cylinders under lean-state operation, so that the air-fuel ratio of exhaust gas that is discharged from the internal combustion engine and flows into the exhaust emission control catalyst substantially maximizes a warm-up efficiency of the exhaust emission control catalyst.

In this case, by means of the aforementioned fuel injection amount correction means, exhaust gas with an air-fuel ratio that substantially maximizes a warm-up efficiency of the exhaust emission control catalyst flows therein. Therefore, the time period required to complete a warm-up process of the exhaust emission control catalyst after engine start is reduced.

It is to be noted herein that when a cylinder is subjected to lean-state operation, a reduced amount of fuel is injected into the cylinder or fuel injection to that cylinder is completely stopped.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF THE PREFERRED EMBODIMENTS

Preferred embodiments of the present invention will be described hereinafter with reference to the accompanying drawings.

Figure 1:
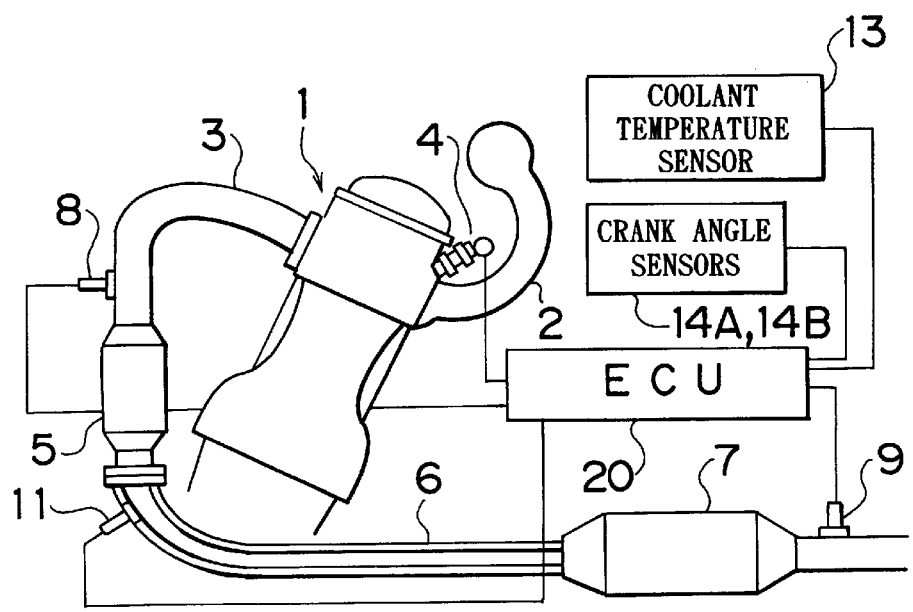
FIG. 1 is a schematic structural view showing an air-fuel ratio control system for a multi-cylinder internal combustion engine according to a first embodiment of the present invention.

FIG. 1 is a schematic structural view showing an air-fuel ratio control system for a multi-cylinder internal combustion engine according to a first embodiment of the present invention. An engine 1 is provided with an intake manifold 2, an exhaust manifold 3 and a fuel injection valve 4. A catalytic converter 5 for controlling exhaust emission is disposed in the exhaust manifold 3. The catalytic converter 5 is quickly activated after start of the engine 1. An exhaust pipe 6 is connected to the exhaust manifold 3. A catalytic converter 7 serves as a main catalyst containing a three-way catalyst that simultaneously controls concentrations of three components, i.e., HC, CO and $NO_x$. The exhaust pipe 6 extends across the catalytic converter 7. A first air-fuel ratio sensor 8 for detecting an air-fuel ratio from a concentration of oxygen contained in exhaust gas that has been discharged from the engine 1 is disposed upstream of the catalytic converter 5 in the exhaust manifold 3. A second air-fuel ratio sensor 9 for detecting an air-fuel ratio from a concentration of oxygen contained in exhaust gas that has been discharged from the engine 1 and passed through the catalytic converter 7 is disposed downstream of the catalytic converter 7 in the exhaust pipe 6. An exhaust gas temperature sensor 11 detects a temperature Tex of exhaust gas that has passed through the catalytic converter 5.

An electronic control unit (ECU) 20 is composed of, for example, a digital computer, and drives start-phase air-fuel ratio control means for controlling an air-fuel ratio in such a manner as to achieve rich-state operation in some of a plurality of cylinders of the engine 1 and lean-state operation in other cylinders during cold start of the engine 1. The ECU 20 includes a ROM, a RAM, a B. RAM (battery backup RAM), a CPU, an input port and an output port, which are interconnected to one another through a bi-directional bus (not shown).

The intake manifold 2 is connected to an intake pipe (not shown), which is connected at its front end to an air flow meter (not shown). The air flow meter generates an analog output voltage that is proportional to an intake air amount. The output voltage is inputted to the input port through an A/D converter (not shown).

A coolant temperature sensor 13 is disposed in a water jacket (not shown) of the engine 1. The coolant temperature sensor 13 detects a coolant temperature THW of the engine 1 and generates an analog voltage that is proportional to the coolant temperature THW. The thus-generated analog voltage is inputted to the input port through the A/D converter.

A distributor (not shown) of the engine 1 has two crank angle sensors 14A, 14B. The crank angle sensor 14A detects a reference position every time a crank shaft rotates by 720° CA and then generates an output pulse signal. The crank angle sensor 14B detects a reference position every time the crank shaft rotates by 30° CA and then generates an output pulse signal. These output pulse signals are inputted to the input port. The output pulse signal generated by the crank angle sensor 14B is also inputted to an interruption terminal of the CPU. For example, the revolution NE of the engine 1 is calculated from the output pulse signals generated by the crank angle sensors 14A, 14B. On the other hand, the output port is connected to the fuel injection valve 4 through a drive circuit (not shown) in the ECU 20. The drive circuit controls a fuel injection amount by changing a time period during which the fuel injection valve 4 is open. The engine 1 has a plurality of fuel injection valves. The total amount of fuel that is injected from all the fuel injection valves 4 into the intake manifolds 2 is controlled such that the air-fuel ratio assumes a target air-fuel ratio with respect to a total amount of intake air that is sucked into the entire engine 1. In other words, if some of the cylinders of the engine 1 are stopped, more fuel is injected into other operative cylinders, which then assume a rich state. Consequently, the air-fuel ratio of the engine 1 is maintained at the target air-fuel ratio as a whole. In this embodiment, the target air-fuel ratio is set in such a manner as to achieve rich-state operation wherein more fuel is injected than is the case with the stoichiometric air-fuel ratio, during a time period starting with cold start of the engine 1 and ending with commencement of partial cylinder stop control wherein some of the cylinders of the engine 1 are stopped. After the engine 1 has been warmed up, the stoichiometric air-fuel ratio is used as the target air-fuel ratio so as to achieve stoichiometric operation. However, it is also possible to achieve stoichiometric operation during a time period starting with cold start of the engine 1 and ending with complete warm-up of the engine 1.

The interruption by the CPU occurs upon completion of an A/D conversion by the A/D converter or upon receipt of an output pulse signal from the crank angle sensor 14B. Digital data that have been inputted to the input port through the A/D converter are read every time an A/D conversion is conducted. The thus-read digital data are stored into the RAM. The revolution NE of the engine 1 is calculated every time an output pulse signal from the crank angle sensor 14B is inputted to the interruption terminal of the CPU. The thus-calculated revolution NE is stored into the RAM. That is, the data on the engine 1 that are stored in the RAM are constantly updated.

The partial cylinder stop control, which is achieved by the ECU 20 according to the present invention, will now be described in detail with reference to a flowchart.

Figure 2:
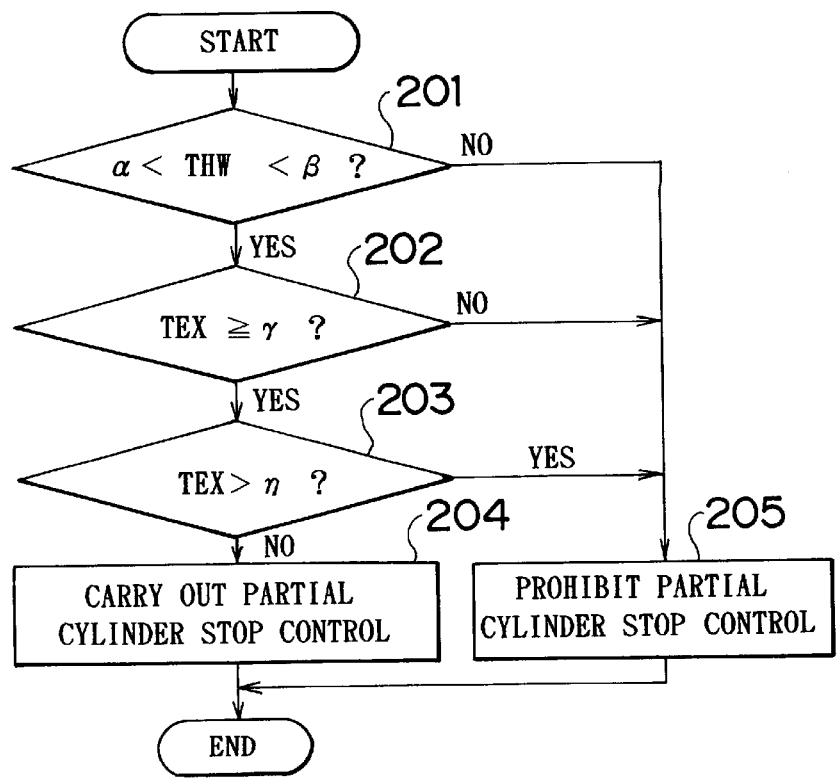
FIG. 2 is a flowchart of a first version of control for stopping operations of some cylinders of the engine (hereinafter referred to as partial cylinder stop control)

FIG. 2 is a flowchart of a first version of the partial cylinder stop control, which is applied to the first embodiment of the present invention as shown in FIG. 1. This control routine is carried out at predetermined intervals, for example, at intervals of 100 ms. First of all, in step 201, it is determined whether or not the coolant temperature THW of the engine 1 is within a certain temperature range ($\alpha<THW<\beta$). If the result is affirmative in step 201, the operation proceeds to step 202. If the result is negative in step 201, the operation proceeds to step 205. The temperatures $\alpha$, $\beta$ are set to 0° C. and 80° C. respectively. When the engine is at an extremely low temperature, that is, when the coolant temperature THW is equal to or lower than 0° C., the partial cylinder stop control is not carried out in view of the driveability of a vehicle to which the engine is mounted. When the engine has been completely warmed up, that is, when the coolant temperature THW is equal to or higher than 80° C., the partial cylinder stop control is not carried out. This is because the catalytic converter 5 has also been completely warmed up.

In the following description based on FIG. 2 and the like, the term "catalyst" indicates a catalyst that is installed in the catalytic converter 5.

In step 202, it is determined whether or not the temperature Tex of catalytic exhaust gas that is discharged from the catalytic converter 5 has become equal to or higher than a predetermined temperature $\gamma$ (e.g. 180° C.). If the result is affirmative in step 202, the operation proceeds to step 203. If the result is negative in step 202, the operation proceeds to step 205. The predetermined temperature $\gamma$ is set to, for example, 180° C. because the catalytic exhaust gas is estimated to be at about 180° C. when the catalyst is at about 200° C. When the catalyst reaches about 200° C., respective portions of the catalyst undergo an exhaust emission control reaction for oxidizing HC. In step 203, it is determined whether or not the exhaust gas temperature Tex has exceeded a second predetermined temperature $\eta$ (e.g. 700° C.). If the result is affirmative in step 203, the operation proceeds to step 205. If the result is negative in step 203, the operation proceeds to step 204. The second predetermined temperature $\eta$ is set to, for example, 700° C. because the catalyst is estimated to be sufficiently activated at 700° C.

When it is determined by execution of steps 201 through 203 that $\alpha<$the coolant temperature THW of the engine $<\beta$ and that $\gamma\leq$the exhaust gas temperature Tex$\leq\eta$, the operation proceeds to step 204 where the partial cylinder stop control is carried out. In other words, when it is determined that the engine has not been warmed up and that the catalyst has not been sufficiently activated since the start of the exhaust emission control reaction, the partial cylinder stop control is carried out. On the other hand, when it is determined by execution of steps 201 through 203 that the coolant temperature THW$\leq\alpha$ or $\beta\leq$ the coolant temperature THW, or that the exhaust gas temperature Tex$<\gamma$ or $\eta<$ the exhaust gas temperature Tex, the operation proceeds to step 205 where the partial cylinder stop control is prohibited. In other words, when it is determined that the engine is at an extremely low temperature or has been completely warmed up, or that the catalyst is in a state prior to commencement of the exhaust emission control reaction or has been sufficiently activated, the partial cylinder stop control is prohibited.

Figure 3:
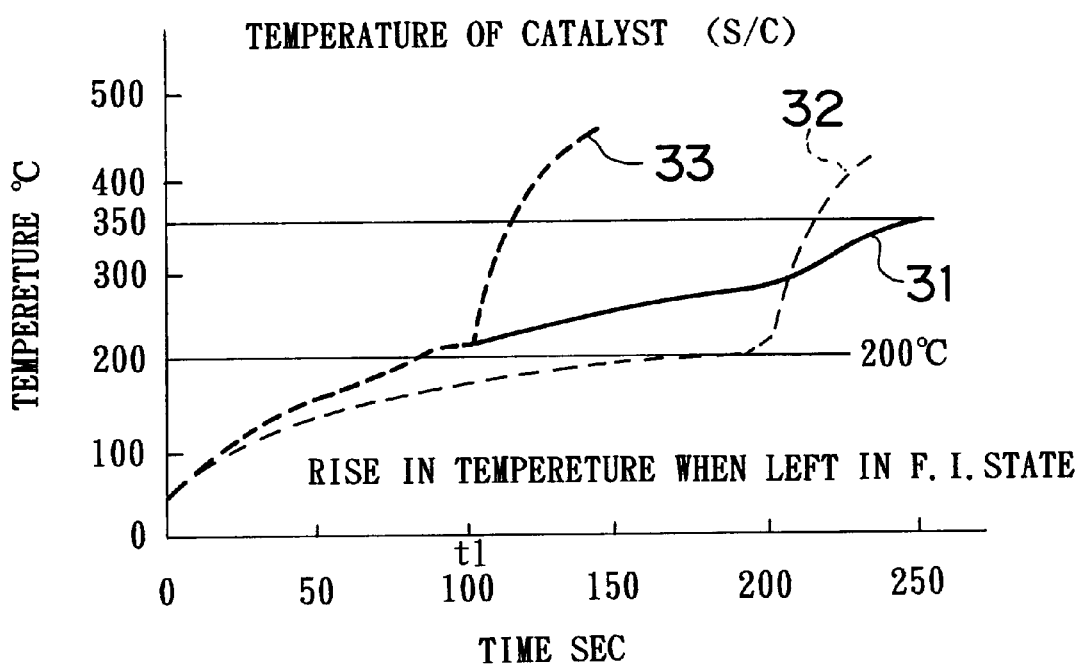
FIG. 3 is a graph showing a relationship between partial cylinder stop control during engine start and changes in temperature of a catalyst.

FIG. 3 is a graph showing a relationship between partial cylinder stop control during engine start and changes in temperature of the catalyst. The axis of abscissa represents a time period that has elapsed since engine start, and the axis of ordinate represents a temperature of the catalyst that is installed in the catalytic converter 5. FIG. 3 shows an experimental result of changes in temperature of the catalyst when the engine is left in an FI (First Idling) state, that is, when the engine is left to rotate at an idling speed. A curve 31 represents changes in temperature of the catalyst in the case where the partial cylinder stop control is not carried out at all. A curve 32 represents changes in temperature of the catalyst in the case where the partial cylinder stop control is carried out immediately after engine start. A curve 33 represents changes in temperature of the catalyst in the case where the partial cylinder stop control is suspended from the engine start to a time point t1 and is carried out from the time point t1. The catalyst reaches about 200° C. at the time point t1, at which respective portions of the catalyst undergo the exhaust emission control reaction for oxidizing HC.

It is understood by comparison that the curve 31 reaches 200° C. earlier than the curve 32. Herein, while the curve 31 represents the case where the partial cylinder stop control is not carried out, the curve 32 represents the case where the partial cylinder stop control is carried out. On the other hand, when the temperature of the catalyst reaches 200° C., if the partial cylinder stop control is carried out so as to supply the catalyst with secondary air, the temperature of the catalyst rises sharply from 200° C. due to what is called an "afterburning" phenomenon. It is apparent that the curve 32 reaches 350° C. earlier than the curve 31. When the catalyst is at 350° C., 50% of the respective portions of the catalyst undergo the exhaust emission control reaction. The temperature at which the catalyst starts rising sharply, that is, the catalytic reaction promoting temperature is about 200° C.

It is then understood by comparison that the curves 31, 33 simultaneously reach 200° C. and that the curve 33 rises sharply from 200° C. and reaches 350° C. earlier than the curves 31, 32. As described above, when the catalyst is at 350° C., 50% of the respective portions of the catalyst undergo the exhaust emission control reaction.

Figure 4:
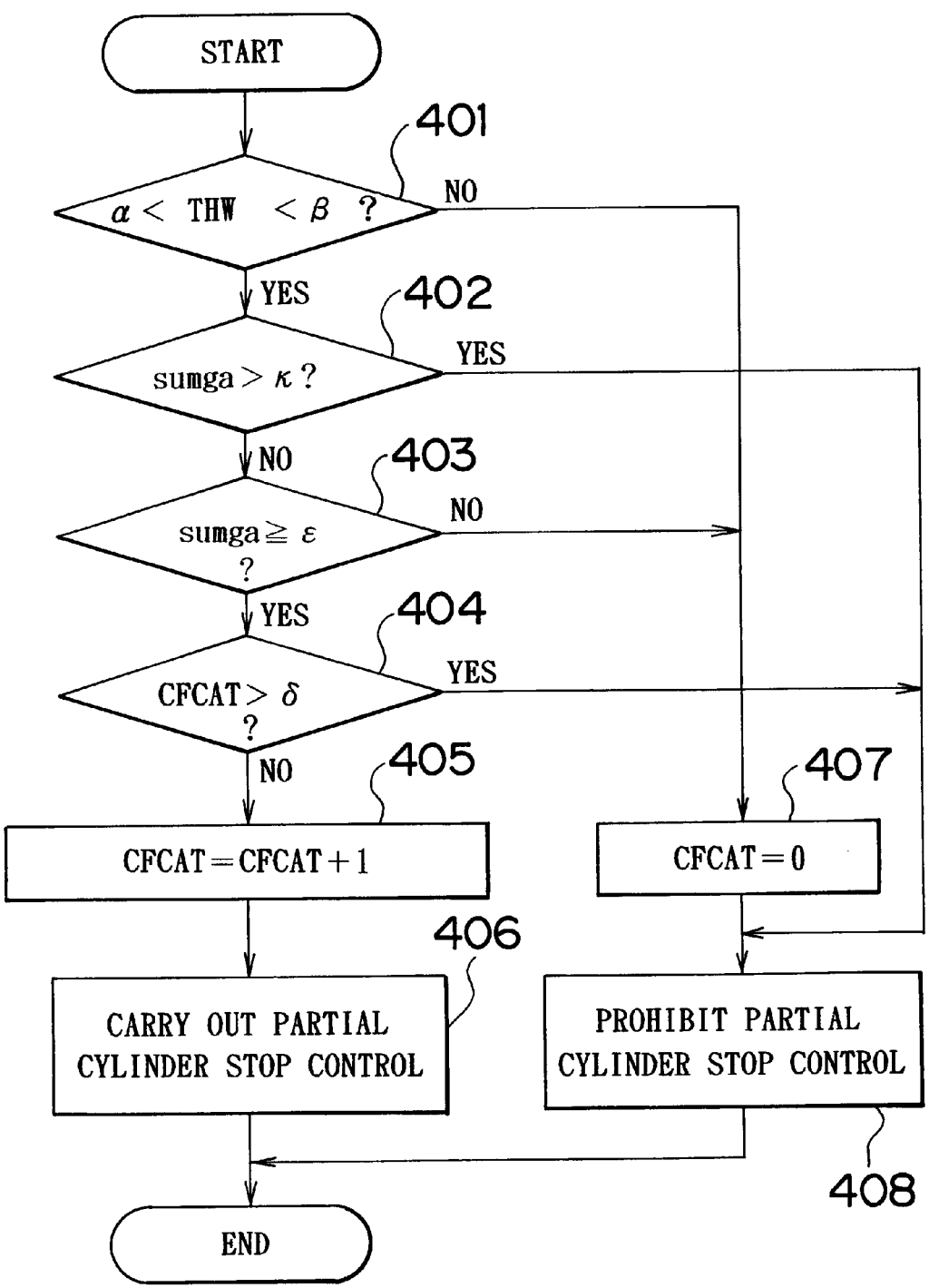
FIG. 4 is a flowchart of a second version of the partial cylinder stop control.

FIG. 4 is a flowchart of a second version of the partial cylinder stop control. This control is applied to an embodiment that dispenses with the exhaust gas temperature sensor 11 of the first embodiment. In this control, instead of using the exhaust gas temperature sensor for detecting a temperature of exhaust gas that is discharged from the engine, the temperature of the catalyst is estimated from a cumulative value sumga of an amount of air that has been sucked into the engine since engine start (hereinafter referred to as a cumulative air amount).

This control routine is carried out at predetermined intervals, for example, at intervals of 100 ms. First of all, in step 401, as is the case with step 201 in FIG. 2, it is determined whether or not the coolant temperature THW of the engine 1 is within a predetermined temperature range ($\alpha$<THW<$\gamma$). If the result is affirmative in step 401, the operation proceeds to step 402. If the result is negative in step 401, the operation proceeds to step 407. A map showing a relationship between the cumulative air amount and the temperature of the catalyst will now be described.

Figure 5:
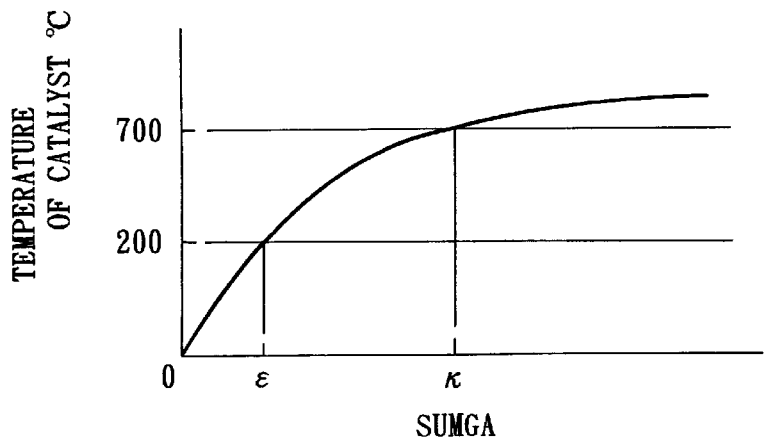
FIG. 5 is a map showing a relationship between the cumulative air amount of the engine and the temperature of the catalyst.

FIG. 5 is a map showing a relationship between the cumulative air amount of the engine and the temperature of the catalyst. Referring to FIG. 5, the axis of abscissa represents a cumulative air amount sumga, i.e., an amount of air that has been sucked into the engine since engine start, and the axis of ordinate represents an experimental value obtained from measurement of the temperature of the catalyst. The temperature of the catalyst changes in accordance with changes in the cumulative air amount sumga. When the cumulative air amount sumga reaches a value of $\epsilon$, the catalyst is at 200° C., where the exhaust emission control reaction is started in some portions of the catalyst. When the cumulative air amount sumga reaches a value of $\kappa$, the catalyst is at 700° C. and is sufficiently activated. The map, which shows a relationship between the experimentally obtained cumulative air amount of the engine and the temperature of the catalyst, is preliminarily stored in the ROM.

Referring again to the flowchart in FIG. 4, in step 402, it is determined whether or not the cumulative air amount sumga has exceeded the predetermined value $\kappa$, which corresponds to a point where the catalyst is at 700° C. If the result is affirmative in step 402, it is concluded that the catalyst has reached an activation start temperature, and the operation proceeds to step 408. If the result is negative in step 402, the operation proceeds to step 403.

In step 403, it is determined whether or not the cumulative air amount sumga has become equal to or greater than the predetermined value $\epsilon$, which corresponds to a point where the catalyst is at 200° C. If the result is affirmative in step 403, it is concluded that the catalyst has reached a temperature for partially starting the exhaust emission control reaction, and the operation proceeds to step 404. If the result is negative in step 403, the operation proceeds to step 407.

In step 404, it is determined whether or not the partial cylinder stop control has been carried out for a predetermined time period $\delta$, for example, 50 seconds. That is, it is determined in step 404 whether or not the following relationship has been established: CFCAT>$\delta$(=500). If the result is affirmative in step 404, the operation proceeds to step 407. If the result is negative in step 404, the operation proceeds to step 405 where one is added to a count value of a counter CFCAT that is designed to measure a time period where the partial cylinder stop control is carried out. The operation then proceeds to step 406.

If the result is negative in step 401 or step 403, the operation proceeds to step 407 where the counter CFCAT is reset to 0. Referring to FIG. 5, the relationship between the cumulative air amount sumga and the temperature of the catalyst has been confirmed using an experimental result that is obtained when the partial cylinder stop control is not carried out, i.e., when all the cylinders are in operation. Thus, the temperature of the catalyst cannot be estimated from the cumulative air amount sumga when the partial cylinder stop control is not carried out, i.e., when the following relationship is established: $\epsilon \leq$ THW $\leq \kappa$. This is why the counter CFCAT is used.

When it is determined by execution of steps 401 through 404 that $\alpha$< the coolant temperature THW of the engine <$\beta$ and that $\epsilon \leq$ the cumulative air amount sumga $\leq \kappa$, the operation proceeds to step 406 where the partial cylinder stop control is carried out. In other words, when it is determined that the engine has not been warmed up, that the catalyst has not been sufficiently activated since the start of the exhaust emission control reaction, and that the time period CFCAT for the partial cylinder stop control $\leq \delta$, the partial cylinder stop control is carried out. On the other hand, when it is determined by execution of steps 401 through 404 that the coolant temperature THW$\leq \alpha$ or $\beta \leq$ the coolant temperature THW, or that the cumulative air amount sumga <$\epsilon$ or $\kappa$< the cumulative air amount sumga, the operation proceeds to step 408 where the partial cylinder stop control is prohibited. In other words, when it is determined that the engine is at an extremely low temperature or has been completely warmed up, or that the catalyst is in a state prior to commencement of the exhaust emission control reaction or has been sufficiently activated, the partial cylinder stop control is prohibited.

Another embodiment will be described hereinafter, wherein the number of cylinders to be subjected to the partial cylinder stop control is changed in consideration of an operational state of the engine, for example, changes in temperature of the catalyst.

Figure 6:
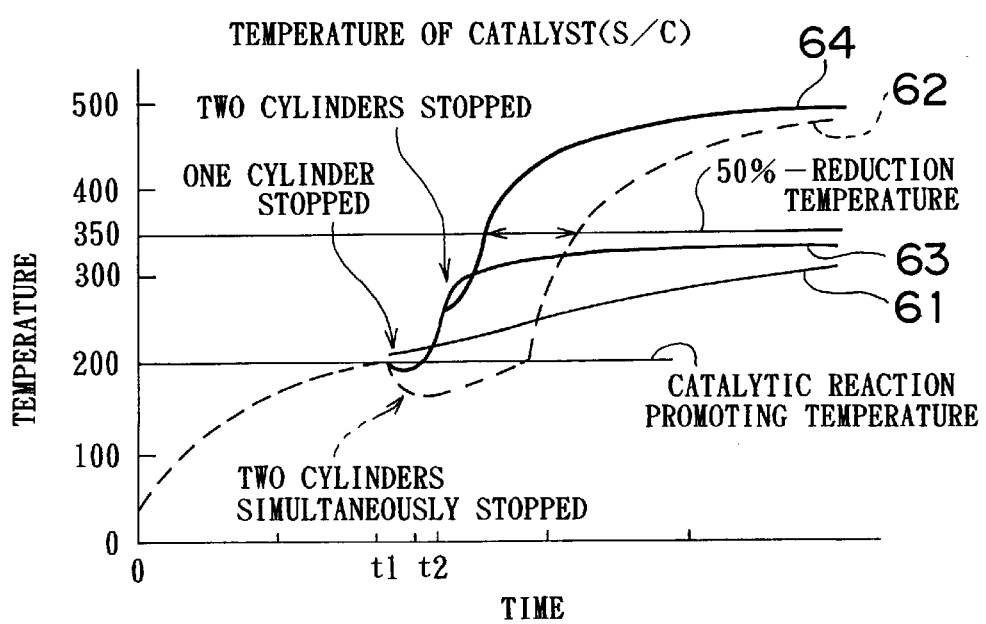
FIG. 6 is a graph showing a relationship between the stepwise partial cylinder stop control and the temperature of the catalyst, during engine start.

FIG. 6 is a graph showing a relationship between the stepwise partial cylinder stop control and the temperature of the catalyst, during engine start. FIG. 6 shows a case where a multi-cylinder engine such as a six-cylinder engine has been started. Referring to FIG. 6, a curve 61 represents changes in temperature of the catalyst in the case where the partial cylinder stop control is not carried out at all. A curve 62 represents changes in temperature of the catalyst in the case where two cylinders are simultaneously stopped. A curve 63 represents changes in temperature of the catalyst in the case where only one cylinder is stopped. A curve 64 represents changes in temperature of the catalyst in the case where two cylinders are stopped after a lapse of a predetermined time period from the stop of one cylinder.

The curves 62, 63 and 64 will now be compared with one another. First of all, as for the curve 62 indicating the case where two cylinders are simultaneously stopped, an excessive amount of secondary air is supplied to the catalyst after the catalyst has reached the catalytic reaction promoting temperature, i.e., 200° C. at a time point t1. Hence, the temperature of the catalyst keeps falling for a certain time period and thereafter rises again to reach 350° C, at which 50% of the respective portions of the catalyst undergo the exhaust emission control reaction. As for the curve 63 indicating the case where one cylinder is stopped, although the temperature of the catalyst keeps falling for a short time period due to the supply of secondary air to the catalyst after the time point t1, it rises again immediately thereafter. However, as compared with the curve 62 indicating the case where two cylinders are simultaneously stopped, it is apparent that the time period required for the catalyst to reach 350° C. becomes longer. As described above, when the catalyst is at 350° C., 50% of the respective portions of the catalyst undergo the exhaust emission control reaction. As for the curve 64 indicating the stepwise cylinder stop control wherein one cylinder is stopped at the time point t1 and two cylinders are stopped at a time point t2, although the temperature of the catalyst keeps falling for a short time period due to a the supply of secondary air to the catalyst after the time point t1, it rises again immediately thereafter. After the time point t2 where the catalyst reaches a temperature slightly higher than 200° C., for example, 220° C., the number of cylinders to be stopped is increased so as to increase an amount of secondary air that is supplied to the cylinder. Thus, as compared with the curves 62, 63, the time period required for the catalyst to reach 350° C., where 50% of the respective portions of the catalyst undergo the exhaust emission control reaction, becomes shorter.

The aforementioned stepwise partial cylinder stop control will now be described using a flowchart.

Figure 7:
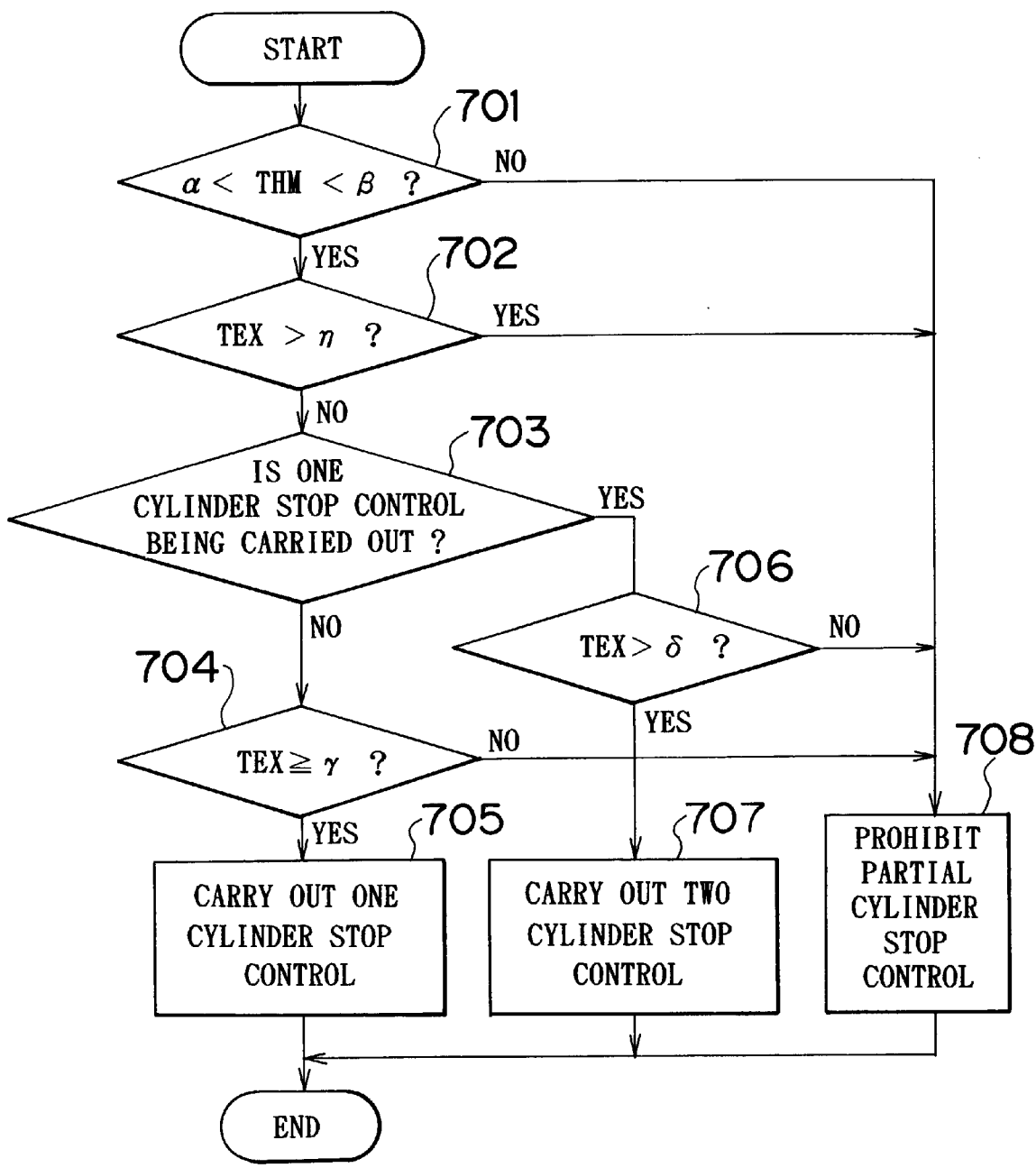
FIG. 7 is a flowchart of a third version of the partial cylinder stop control.

FIG. 7 is a flowchart of a third version of the partial cylinder stop control. This control is applied to the first embodiment shown in FIG. 1. This control routine is carried out at predetermined intervals, for example, at intervals of 100 ms. First of all, in step 701, as is the case with step 201 in FIG. 2, it is determined whether or not the coolant temperature THW of the engine 1 is within a predetermined temperature range ($\alpha$<THW<$\beta$). If the result is affirmative in step 701, the operation proceeds to step 702. If the result is negative in step 701, the operation proceeds to step 708.

In step 702, it is determined whether or not the temperature Tex of the catalytic exhaust gas has exceeded a second predetermined temperature $\eta$ (e.g. 700° C.). If the result is affirmative in step 702, the operation proceeds to step 708. If the result is negative in step 702, the operation proceeds to step 703. When the catalytic exhaust gas is at 700° C., the catalyst is estimated to be sufficiently activated. In step 703, it is determined using a flag whether or not one cylinder stop control is being carried out. If the result is negative in step 703, the operation proceeds to step 704. If the result is affirmative in step 703, the operation proceeds to step 706.

In step 704, it is determined whether or not the temperature Tex of the catalytic exhaust gas has become equal to or higher than the first predetermined temperature $\gamma$ (e.g. 180° C.). If the result is affirmative in step 704, the operation proceeds to step 705. If the result is negative in step 704, the operation proceeds to step 708. The first predetermined temperature $\gamma$ is set to, for example, 180° C. because the catalytic exhaust gas is estimated to be at about 180° C. when the catalyst is at about 200° C. When the catalyst reaches about 200° C., respective portions of the catalyst undergo the exhaust emission control reaction for oxidizing HC.

In step 706, it is determined whether or not the exhaust gas temperature Tex has exceeded a third predetermined temperature $\delta$ (=220° C.). If the result is affirmative in step 706, the operation proceeds to step 707. If the result is negative in step 706, this routine is terminated. The third predetermined temperature is set to 220° C., which is a temperature suited to determine whether or not the temperature of the catalyst has slightly exceeded the catalytic reaction promoting temperature, i.e., 200° C. after the start of the exhaust emission control reaction at the time point t1 due to the supply of secondary air to the catalyst based on one cylinder stop control.

When it is determined by execution of steps 701 through 704 and step 706 that $\alpha$< the coolant temperature THW of the engine <$\beta$ and that $\gamma \leq$ the exhaust gas temperature Tex$\leq \delta$, the operation proceeds to step 705 where one cylinder stop control is carried out. In other words, when it is determined that the engine has not been warmed up and that the catalyst has not reached a temperature slightly higher than the catalytic reaction promoting temperature, i.e., 200° C. after the start of the exhaust emission control reaction, one cylinder stop control is carried out. When it is determined that $\alpha$< the coolant temperature THW of the engine <$\beta$ and that $\delta \leq$ the exhaust gas temperature Tex$\leq \eta$, the operation proceeds to step 707 where two cylinder stop control is carried out. In other words, when it is determined that the engine has not been warmed up and that the catalyst is at a temperature higher than the catalytic reaction promoting temperature, i.e., 200° C. and has not been sufficiently activated, two cylinder stop control is carried out. On the other hand, when it is determined by execution of steps 701 through 704 and step 706 that the coolant temperature THW$\leq \alpha$ or $\beta \leq$ the coolant temperature THW, or that the exhaust gas temperature Tex<$\gamma$ or $\eta$< the exhaust gas temperature Tex, the operation proceeds to step 708 where the partial cylinder stop control is prohibited. In other words, when it is determined that the engine is at an extremely low temperature or has been completely warmed up, or that the catalyst is in a state prior to commencement of the exhaust emission control reaction or has been sufficiently activated, the partial cylinder stop control is prohibited.

According to the aforementioned third version of the partial cylinder stop control, the transition from a state where one cylinder is stopped to a state where two cylinders are stopped is made only if it is confirmed, as an operational state of the engine, that the temperature of the catalyst has risen above the catalytic reaction promoting temperature. However, instead of using the temperature of the catalyst as an operational state of the engine, the number of cylinders to be stopped may also be changed in accordance with a loaded condition of the engine. In this case, as the load applied to the engine becomes higher, the engine necessitates a higher torque. Therefore, the number of cylinders to be stopped is set small.

In the third version of the partial cylinder stop control, which has been described with reference to FIG. 7, the partial cylinder stop control is carried out based on an estimated temperature of the catalyst, which is detected by the exhaust gas temperature sensor. However, instead of using the exhaust gas temperature sensor, the third version of the partial cylinder stop control can also be carried out based on a temperature of the catalyst that is estimated from a cumulative air amount of the engine.

In the aforementioned third version of the partial cylinder stop control, at most two cylinder are stopped in the six-cylinder engine. However, it is also possible to stop at most three cylinders in an eight-cylinder engine or at most four cylinders in a twelve-cylinder engine. In other words, the maximum number of cylinders to be stopped can be suitably changed according to the type of an engine.

Figure 8:
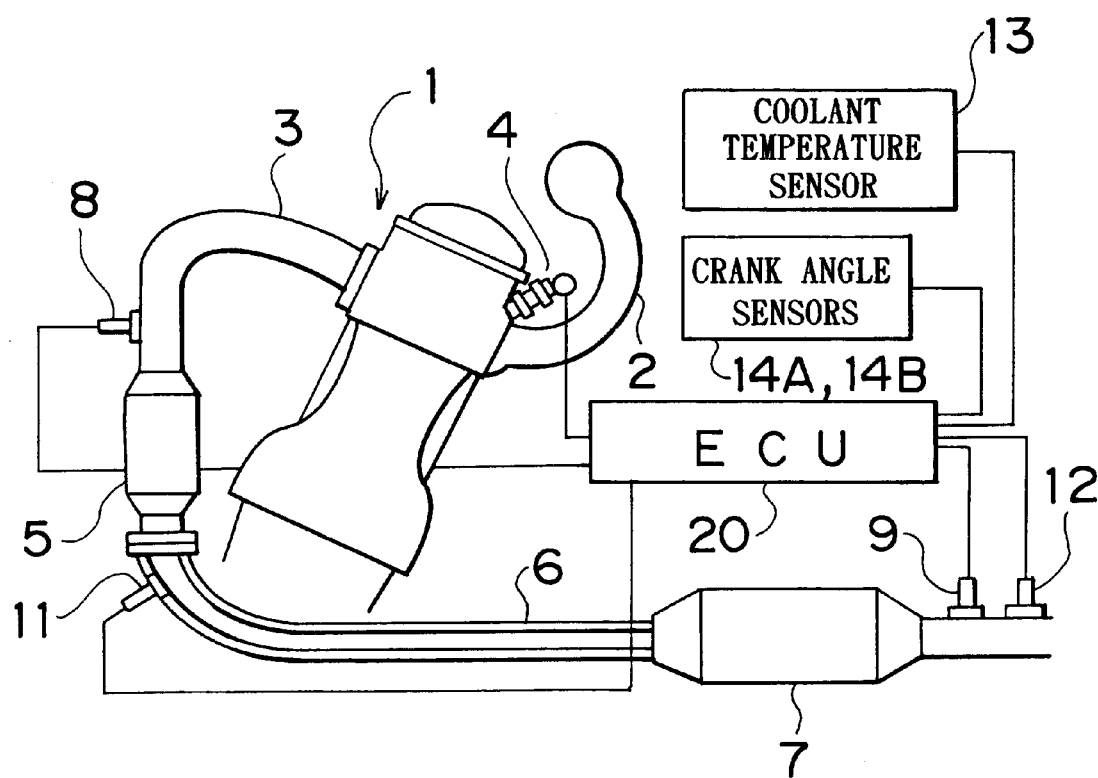
FIG. 8 is a schematic structural view showing an air-fuel ratio control system for a multi-cylinder internal combustion engine according to a second embodiment of the present invention.

FIG. 8 is a schematic structural view showing an air-fuel ratio control system for a multi-cylinder internal combustion engine according a second embodiment of the present invention. The schematic structural view of the second embodiment shown in FIG. 8 is substantially the same as the schematic structural view of the first embodiment shown in FIG. 1, except that an exhaust gas temperature sensor 12 is disposed downstream of the catalytic converter 7 in the exhaust pipe 6.

Figure 9:
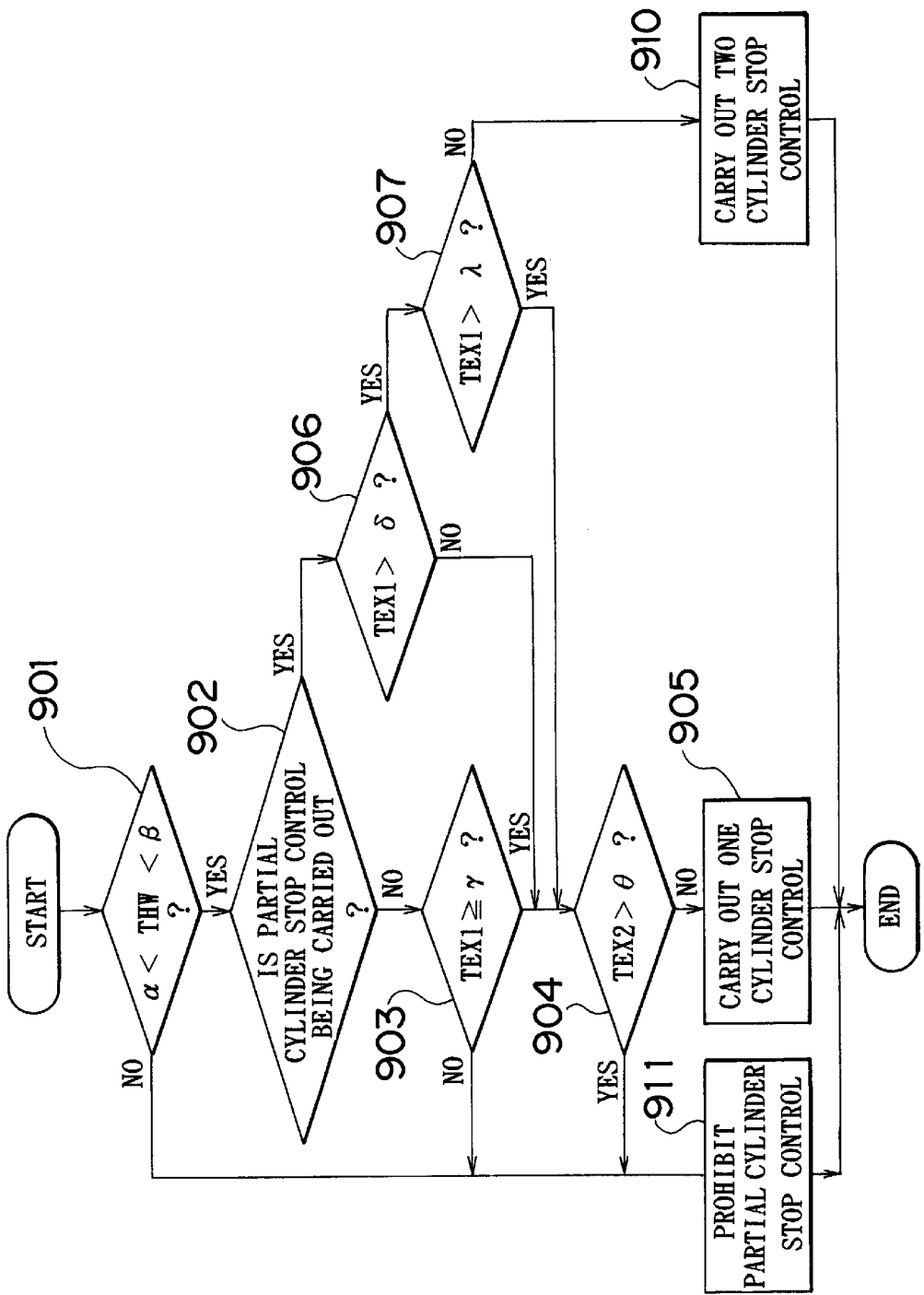
FIG. 9 is a flowchart of a fourth version of the partial cylinder stop control.

FIG. 9 is a flowchart of a fourth version of the partial cylinder stop control, which is applied to the second embodiment of the present invention as shown in FIG. 8. While a main catalyst (M/C) as a second catalyst is being warmed up after completion of a warm-up process of a start catalyst (S/C) as a first catalyst, if an excessive number of cylinders are stopped, the temperature of the start catalyst (S/C) exceeds an OT (Over Temperature). As a result, the start catalyst (S/C) may become overheated and deteriorate in performance. In order to prevent such deterioration in performance of the start catalyst (S/C), the fourth version of the partial cylinder stop control is carried out until the main catalyst (M/C) is completely warmed up, while suitably adjusting the number of cylinders to be stopped.

This control routine is carried out at predetermined intervals, for example, at intervals of 100 ms. First of all, in step 901, as is the case with step 201 in FIG. 2, it is determined whether or not the coolant temperature THW of the engine 1 is within a predetermined temperature range ($\alpha$<THW<$\beta$). If the result is affirmative in step 901, the operation proceeds to step 902. If the result is negative in step 901, the operation proceeds to step 911.

In step 902, it is determined using a flag whether or not the partial cylinder stop control is being carried out. If the result is affirmative in step 902, the operation proceeds to step 906. If the result is negative in step 902, the operation proceeds to step 903. In step 903, it is determined whether or not the first temperature Tex1 of catalytic exhaust gas that is discharged from the first catalyst (S/C) has become equal to or higher than a first predetermined temperature γ (e.g. 180° C.). If the result is affirmative in step 903, the operation proceeds to step 904. If the result is negative in step 903, the operation proceeds to step 911. The first predetermined temperature γ is set to, for example, 180° C. because the catalytic exhaust gas is estimated to be at about 180° C. when the first catalyst (S/C) is at about 200° C. When the first catalyst reaches about 200° C., respective portions of the first catalyst undergo the exhaust emission control reaction for oxidizing HC.

In step 904, it is determined whether or not the second temperature Tex2 of exhaust gas that is discharged from the second catalyst (M/C) has exceeded a fifth predetermined temperature θ (=600° C.). If the result is affirmative in step 904, the operation proceeds to step 911. If the result is negative in step 904, the operation proceeds to step 905. The fifth predetermined temperature θ is set to 600° C. because the second catalyst is estimated to be sufficiently activated at 600° C.

In step 906, it is determined whether or not the first exhaust gas temperature Tex1 has exceeded a third predetermined temperature δ (=220° C.). If the result is affirmative in step 906, the operation proceeds to step 907. If the result is negative in step 906, the operation proceeds to step 904. The third predetermined temperature δ is set to, for example, 220° C., which is a temperature suited to determine whether or not the temperature of the first catalyst has started rising after the start of the exhaust emission control reaction at the time point tl due to the supply of secondary air to the catalyst based on one cylinder stop control.

In step 907, it is determined whether or not the temperature Tex1 of exhaust gas that is discharged from the first catalyst has exceeded a fourth predetermined temperature λ (=700° C.). If the result is affirmative in step 907, the operation proceeds to step 904. If the result is negative in step 907, the operation proceeds to step 910. The fourth predetermined temperature λ is set to 700° C. because the first catalyst is estimated to be sufficiently activated at 700° C., where there is no possibility of the first catalyst becoming overheated.

In step 905, one cylinder stop control is carried out. In step 910, two cylinder stop control is carried out. In step 911, the partial cylinder stop control is prohibited.

In the fourth version of the partial cylinder stop control, which has been described with reference to FIG. 9, the partial cylinder stop control is carried out based on estimated temperatures of the first and second catalysts, which temperatures are detected by first and second exhaust gas temperature sensors respectively. However, instead of using these exhaust gas temperature sensors, the fourth version of the partial cylinder stop control can also be carried out based on temperatures of the first and second catalysts that are estimated from a cumulative air amount of the engine.

In the aforementioned fourth version of the partial cylinder stop control, at most two cylinder are stopped in the six-cylinder engine. However, it is also possible to stop at most three cylinders in an eight-cylinder engine or at most four cylinders in a twelve-cylinder engine. In other words, the maximum number of cylinders to be stopped can be suitably changed according to the type of an engine.

Figure 10:
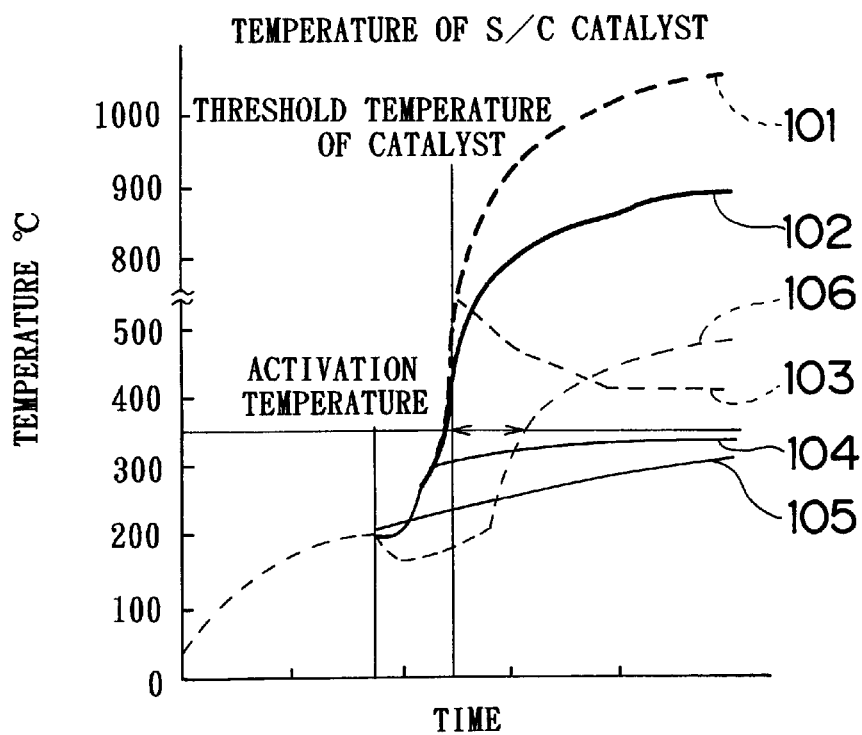
FIG. 10 is a graph showing changes in temperature of a start catalyst (S/C) during start of a multi-cylinder engine.
Figure 11:
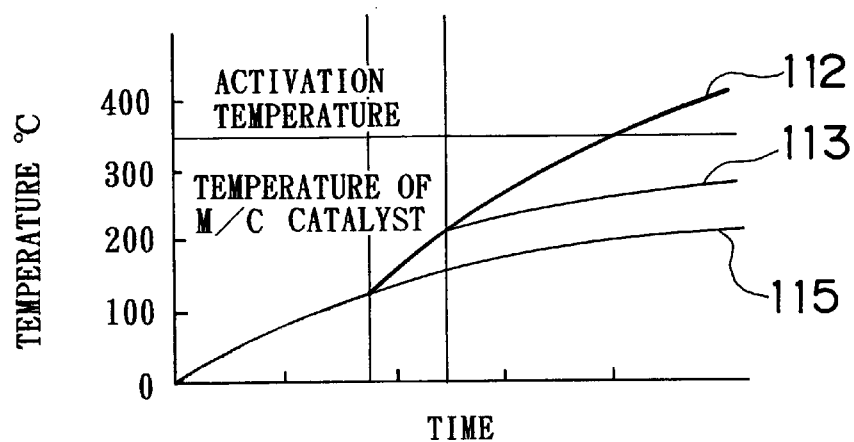
FIG. 11 is a graph showing changes in temperature of a main catalyst (M/C) during start of the multi-cylinder engine.

FIG. 10 is a graph showing changes in temperature of the start catalyst (S/C) during start of a multi-cylinder engine. FIG. 11 is a graph showing changes in temperature of the main catalyst (M/C) during start of the multi-cylinder engine. In each of the graphs shown in FIGS. 10, 11, the axis of abscissa represents time, and the axis of ordinate represents temperatures of the respective catalysts.

Referring to FIG. 10, a curve 101 represents changes in temperature of the start catalyst (S/C) in the case where the aforementioned third version of the partial cylinder stop control is carried out. A curve 102 represents changes in temperature of the start catalyst (S/C) in the case where the aforementioned fourth version of the partial cylinder stop control is carried out so as to prevent the start catalyst (S/C) from becoming overheated. A curve 103 represents changes in temperature of the start catalyst (S/C) in the case where the third version of the partial cylinder stop control is carried out and this control is then prohibited as soon as it is confirmed that the start catalyst (S/C) has been completely warmed up. A curve 104 represents changes in temperature of the start catalyst (S/C) in the case where one cylinder stop control is exclusively carried out. A curve 105 represents changes in temperature of the start catalyst (S/C) in the case where the partial cylinder stop control is not carried out at all. A curve 106 represents changes in temperature of the start catalyst (S/C) in the case where two cylinder stop control is carried out after the start catalyst (S/C) has reached the catalytic reaction promoting temperature (200° C.).

On the other hand, referring to FIG. 11, a curve 112 represents changes in temperature of the main catalyst M/Cin the case where the fourth version of the partial cylinder stop control is carried out so as to prevent the start catalyst (S/C) form becoming overheated. A curve 113 represents changes in temperature of the main catalyst M/Cin the case where the third version of the partial cylinder stop control is carried out and this control is then prohibited as soon as it is confirmed that the start catalyst (S/C) has been completely warmed up. A curve 115 represents changes in temperature of the main catalyst M/Cin the case where the partial cylinder stop control is not carried out at all.

Figure 12:
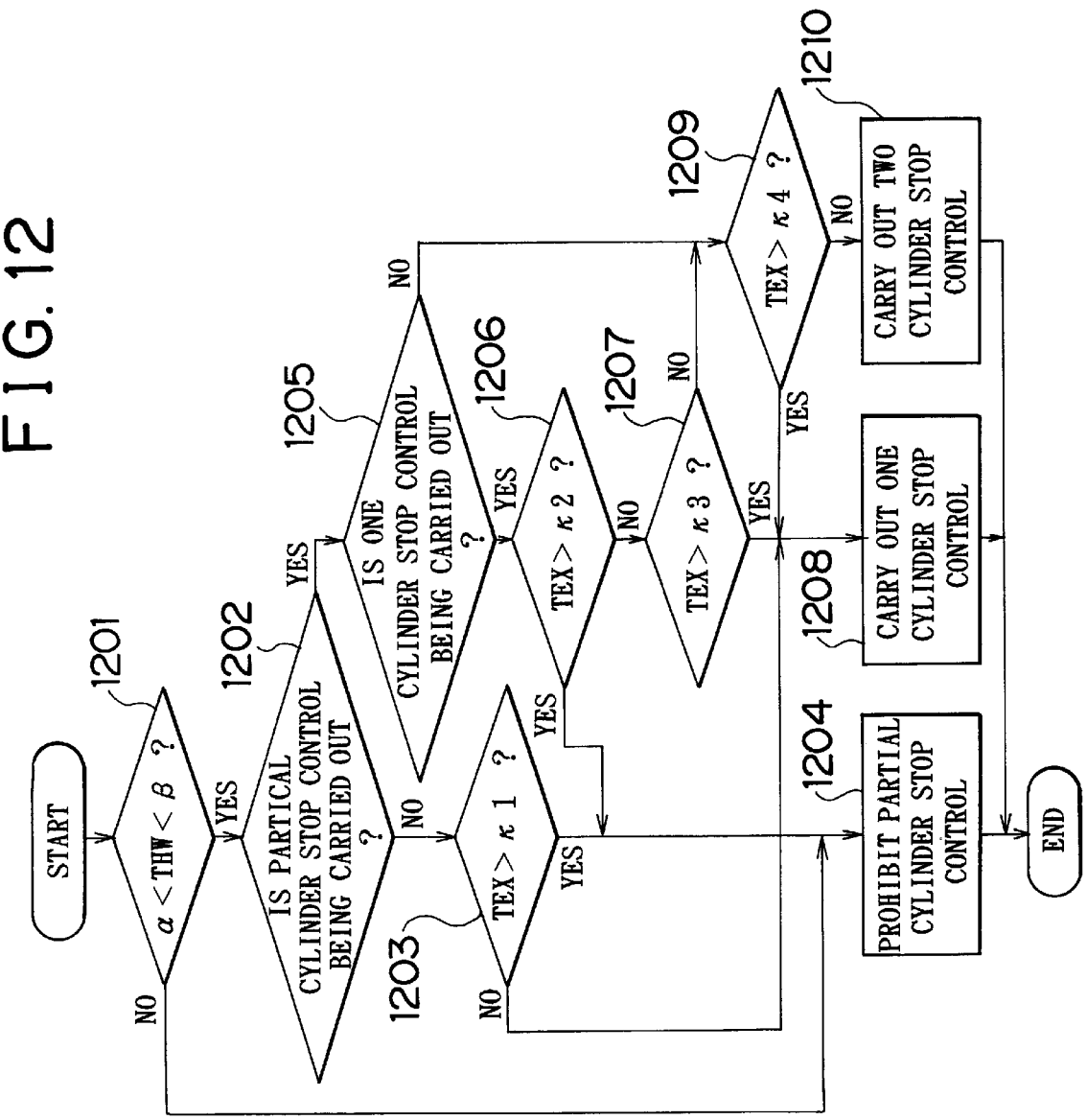
FIG. 12 is a fifth version of the partial cylinder stop control.

FIG. 12 is a flowchart of a fifth version of the partial cylinder stop control, which is applied to the first embodiment of the present invention as shown in FIG. 1. In the case where an exhaust system such as the exhaust manifold has not been sufficiently warmed up even if the first catalyst has been warmed up due to the partial cylinder stop control, or in the case where the temperature of exhaust gas that is discharged from the engine is low owing to an idling state or the like even if the exhaust manifold has been warmed up, if the partial cylinder stop control is prohibited, the first catalyst is deprived of its heat by the exhaust system. As a result, the temperature of the first catalyst may drop. In order to prevent the temperature of the first catalyst from dropping, according to the fifth version of the partial cylinder stop control, the partial cylinder stop control is carried out again upon detection of a fall in temperature of the first catalyst. Thus, the first catalyst is prevented from being cooled again. This control routine is carried out at predetermined intervals, for example, at intervals of 100 ms. First of all, in step 1201, as is the case with step 201 in FIG. 2, it is determined whether or not the coolant temperature THW of the engine 1 is within a predetermined temperature range (α<THW<β). If the result is affirmative in step 1201, the operation proceeds to step 1202. If the result is negative in step 1201, the operation proceeds to step 1204.

Then in step 1202, it is determined using a flag whether or not the partial cylinder stop control is being carried out. If the result is affirmative in step 1202, the operation proceeds to step 1205. If the result is negative in step 1202, the operation proceeds to step 1203. In step 1203, it is determined whether or not the temperature Tex of exhaust gas that is discharged from the first catalyst has exceeded κ1 (κ1=500° C.). If Tex>κ1, the operation proceeds to step 1204. If Tex≦κ1, the operation proceeds to step 1208. If it is determined in step 1203 that the exhaust gas temperature Tex has become equal to or lower than κ1, one cylinder stop control is carried out in step 1208 so as to prevent the first catalyst from being cooled again.

In step 1205, it is determined using a flag whether or not one cylinder stop control is being carried out. If the result is affirmative in step 1205, the operation proceeds to step 1206. If it is determined in step 1205 that two cylinder stop control is being carried out instead of one cylinder stop control, the operation proceeds to step 1209. In step 1206, it is determined whether or not the temperature Tex of exhaust gas that is discharged from the first catalyst has exceeded κ2 (κ2=700° C.). If Tex>κ2, the operation proceeds to step 1204. If Tex≦κ2, the operation proceeds to step 1207. The temperature κ2 is set such that the first catalyst (S/C) does not reach the over temperature (OT) during one cylinder stop control.

In step 1207, it is determined whether or not the temperature Tex of exhaust gas that is discharged from the first catalyst has exceeded κ3 (κ3=600° C.). If Tex>κ3, the operation proceeds to step 1208. If Tex≦κ3, the operation proceeds to step 1209. If it is determined in step 1207 that the exhaust gas has become equal to or lower than κ3, two cylinder stop control is carried out in step 1210 so as to prevent the first catalyst from being cooled again.

In step 1209, it is determined whether or not the temperature Tex of exhaust gas that is discharged from the first catalyst has exceeded κ4 (κ4=800° C.). If Tex>κ4, the operation proceeds to step 1208. If Tex≦κ4, the operation proceeds to step 1210. The temperature κ4 is set such that the first catalyst (S/C) does not reach the over temperature (OT) during two cylinder stop control.

In step 1204, the partial cylinder stop control is prohibited. In step 1208, one cylinder stop control is carried out. In step 1210, two cylinder stop control is carried out.

The amount of fuel injected into the operative cylinders, which are subjected to the partial cylinder stop control, will now be described with respect to the first and second embodiments of the present invention.

Figure 13:
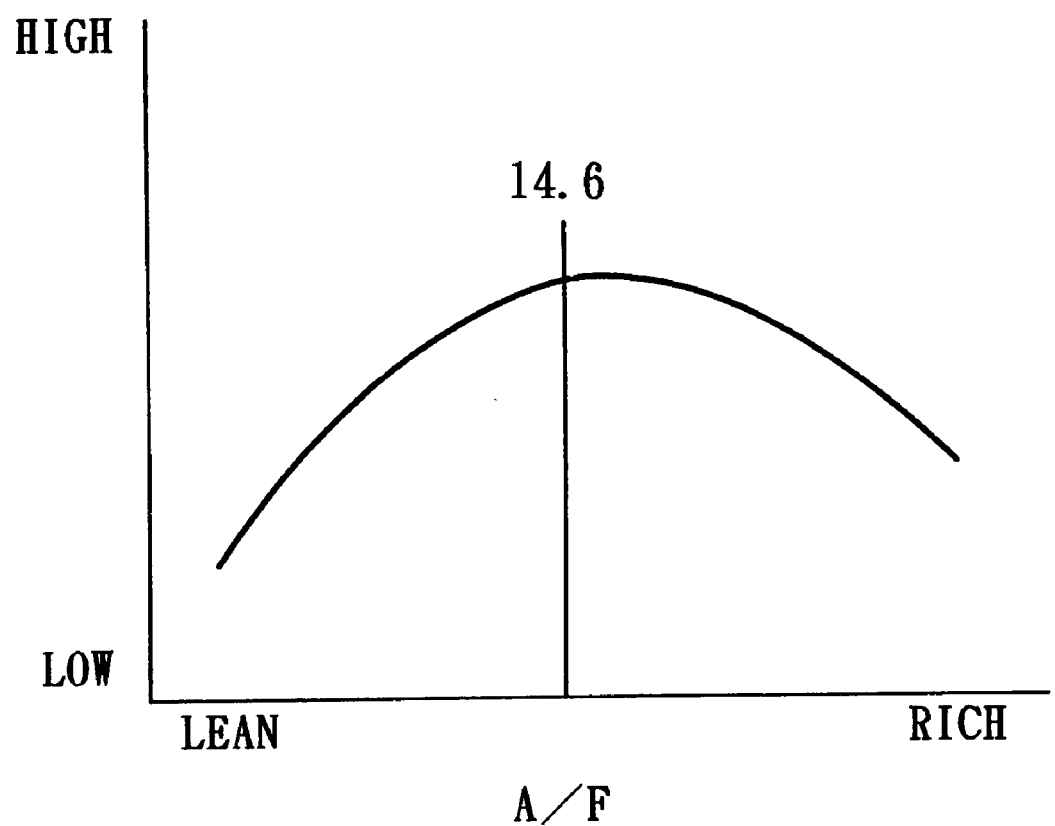
FIG. 13 is a map showing a relationship between the air-fuel ratio of intake gas that flows into the catalyst and the temperature of the catalyst.

FIG. 13 is a map showing a relationship between the air-fuel ratio of intake gas that flows into the catalyst and the temperature of the catalyst. Referring to FIG. 13, the axis of abscissa represents an air-fuel ratio of exhaust gas that is about to flow into the first catalyst after having been discharged from the engine, and the axis of ordinate represents a temperature of the first catalyst. It is apparent from FIG. 13 that when the air-fuel ratio of exhaust gas that flows into the first catalyst is equal to the stoichiometric air-fuel ratio, that is, 14.6, the temperature of the first catalyst reaches its peak. This is because the catalytic reaction in the first catalyst is most drastically activated at a point corresponding to the stoichiometric air-fuel ratio.

Hence, in order to activate the first catalyst at an early stage, the amount of fuel injected into the engine that is subjected to the partial cylinder stop control needs to be determined in accordance with the number of inoperative cylinders, that is, the amount of air (oxygen) that is discharged from the inoperative cylinders so that the air-fuel ratio of exhaust gas that flows into the first catalyst becomes the stoichiometric air-fuel ratio. Thus, in order to calculate an amount of fuel injected into the operative cylinders that are not to be stopped during the partial cylinder stop control, it is necessary to calculate an air-fuel ratio of the operative cylinders in accordance with the number of the inoperative cylinders using the formulas shown below. For example, in the case of the eight-cylinder engine, if fuel is injected in an amount that is calculated in accordance with the air-fuel ratio obtained as shown below, the air-fuel ratio of exhaust gas that flows into the first catalyst becomes the stoichiometric air-fuel ratio, whereby the first catalyst is activated at an early stage.

When one cylinder is inoperative, the air-fuel ratio of the operative cylinders is set to 14.6×(7/8)=12.8. When two cylinders are inoperative, the air-fuel ratio of the operative cylinders is set to 14.6×(6/8)=11.0. When three cylinders are inoperative, the air-fuel ratio of the operative cylinders is set to 14.6×(5/8)=9.1. When four cylinders are inoperative, the air-fuel ratio of the operative cylinders is set to 14.6×(4/8)=7.3.

As described hitherto, according to the air-fuel ratio control system for the multi-cylinder internal combustion engine of the aforementioned first and second embodiments, an increased amount of fuel is injected into all the cylinders so as to warm up the engine until the exhaust emission control catalyst reaches an activation start temperature, and lean-state operation wherein only some of the cylinders are in operation is started once the catalyst has reached the activation start temperature. Therefore, the time period required to complete a warm-up process of the exhaust emission control catalyst after engine start can be shortened. Hence, at an early stage, the catalyst can start controlling concentrations of emission substances contained in exhaust gas that is discharged from the engine.

One or more of the cylinders may also be caused to undergo lean-state operation during a period before the exhaust emission control catalyst reaches the activation start temperature. In this case, the target air-fuel ratio for the cylinders that are to undergo lean-state operation before the exhaust emission control catalyst reaches the activation start temperature is set lower than the target air-fuel ratio for lean-state operation after the exhaust emission control catalyst reaches the activation start temperature. Therefore, it becomes possible to reduce the extent to which the exhaust emission control catalyst is cooled by unburned air before the exhaust emission control catalyst reaches the activation start temperature.

The target air-fuel ratio for the cylinders that are to undergo before the exhaust emission control catalyst reaches the activation start temperature needs only to be set to such a ratio value that the extent to which the exhaust emission control catalyst is air-cooled is reduced. Therefore, it is not necessary that the target air-fuel ratio after the exhaust emission control catalyst reaches the activation start temperature be set higher than the target air-fuel ratio before the exhaust emission control catalyst reaches the activation start temperature. That is, only the requirement concerned is that during a period until the exhaust emission control catalyst reaches the activation start temperature, an upper limit value of the target air-fuel ratio be set at such a value that the exhaust emission control catalyst is not considerably air-cooled.

After the catalyst has reached the activation start temperature, the number of cylinders that are to undergo lean-state operation can be increased gradually, instead of simultaneously starting lean-state operation of those cylinders. In this case, it is possible to prevent the temperature of the exhaust emission control catalyst from dropping due to an abrupt inflow of secondary air, and to reduce a time period required to complete a warm-up process of the exhaust emission control catalyst after engine start.

Further, when the exhaust emission control catalyst reaches a target temperature, the number of cylinders that are to undergo lean-state operation is reduced. Thus, it is possible to prevent the exhaust emission control catalyst from becoming overheated and deteriorating in performance.

Still further, exhaust gas with an air-fuel ratio that substantially maximizes a warm-up efficiency of the exhaust emission control catalyst is made to flow into the catalyst. Thus, the time period required to complete a warm-up process of the exhaust emission control catalyst after engine start can be shortened.

In the aforementioned embodiments, as the catalytic converters 5, 7, a catalytic converter with an electrically heated catalyst (EHC) may be employed.

Although the engine 1 has a plurality of fuel injection valves 4, the engine 1 may be provided with only one fuel injection valve that injects fuel into the respective cylinders. In this case, the partial cylinder stop control may be carried out by selectively supplying air-fuel mixture and unmixed gas through switching operations of the valves.

As the example in the aforementioned embodiments shows, lean-state operation is achieved by the partial cylinder stop control wherein fuel injection into some of the cylinders is stopped. However, the present invention is not limited to that example. In the present invention, lean-state operation may also be achieved by reducing an amount of fuel injected into the cylinders so as to increase an amount of oxygen that is discharged from those cylinders. The present invention may also be applied to an internal combustion engine equipped with a lean burn system or a cylinder injection system.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An air-fuel ratio control system for a multi-cylinder internal combustion engine having a plurality of cylinders, comprising:

an exhaust emission control catalyst disposed in an exhaust passage of the internal combustion engine;

air-fuel ratio control means for individually controlling an air-fuel ratio in each of at least two of the internal combustion engine cylinders, wherein the air-fuel ratio control means controls the air-fuel ratio in at least one of the at least two cylinders to be different from the air-fuel ratio in at least one of the other cylinders of the internal combustion engine; and catalyst temperature detection means for detecting a temperature of the exhaust emission control catalyst, wherein if the temperature of the exhaust emission control catalyst is lower than a first predetermined temperature, the air-fuel ratio control means reduces an upper limit of an air-fuel ratio for at least one of the at least two cylinders, in comparison with an upper limit of the air-fuel ratio for the at least one of the at least two cylinders used if the temperature of the exhaust emission control catalyst is equal to or higher than the first predetermined temperature.

2. The air-fuel ratio control system according to claim 1, wherein the first predetermined temperature is an activation start temperature at which an exhaust emission control reaction is started in the exhaust emission control catalyst.

3. The air-fuel ratio control apparatus according to claim 1, wherein until the temperature of the exhaust emission control catalyst detected by the catalyst temperature detection means reaches the first predetermined temperature during a cold start of the internal combustion engine, the air-fuel ratio control means controls an air-fuel ratio in each cylinder so as to achieve one of rich-state operation and stoichiometric operation in all the cylinders, and wherein after the temperature of the exhaust emission control catalyst has exceeded the first predetermined temperature, the air-fuel ratio control means controls the air-fuel ratio in each cylinder so as to achieve lean-state operation in a first portion of the plurality of cylinders and rich-state operation in a second portion of the plurality of cylinders.

4. The air-fuel ratio control system according to claim 3, wherein the air-fuel ratio control means gradually increases the number of cylinders included in the first portion of the plurality of cylinders in accordance with an operational state of the internal combustion engine.

5. The air-fuel ratio control system according to claim 3, wherein the air-fuel ratio control means reduces the number of cylinders included in the first portion of the plurality of cylinders when the temperature of the exhaust emission control catalyst reaches a second predetermined temperature.

6. The air-fuel ratio control system according to claim 5, wherein the second predetermined temperature is a temperature above which the exhaust emission control catalyst may be overheated and deteriorated in performance.

7. The air-fuel ratio control system according to claim 1, further comprising:

fuel injection amount correction means for correcting an amount of fuel injected into the second portion of the plurality of cylinders in accordance with an amount of air discharged from the first portion of the plurality of cylinders, so that an air-fuel ratio of exhaust gas discharged from the internal combustion engine and flowing into the exhaust emission control catalyst substantially maximizes a warm-up efficiency of the exhaust emission control catalyst.

8. An air-fuel ratio control system for a multi-cylinder internal combustion engine having a plurality of cylinders, comprising:

an exhaust emission control catalyst disposed in an exhaust passage of the internal combustion engine;

air-fuel ratio control means for individually controlling an air-fuel ratio in each of at least two of the internal combustion engine cylinders, wherein the air-fuel ratio control means controls the air-fuel ratio in at least one of the at least two cylinders to be different from the air-fuel ratio in at least one of the other cylinders of the internal combustion engine; and catalyst temperature detection means for detecting a temperature of the exhaust emission control catalyst;

catalyst temperature determination means for determining whether the temperature of the exhaust emissions control catalyst detected by the catalyst temperature detection means has reached a predetermined temperature; and operation control means for controlling, by means of the air-fuel ratio control means, air-fuel ratios in each of the respective cylinders so as to achieve, until the temperature of the exhaust emission control catalyst detected by the catalyst temperature detection means reaches the first predetermined temperature during a cold start of the internal combustion engine, the air-fuel ratio in each cylinder so as to achieve one of rich-state operation and stoichiometric operation in all the cylinders, and wherein after the temperature of the exhaust emission control catalyst has exceeded the first predetermined temperature, the air-fuel ratio control means controls the air-fuel ratio in each cylinder so as to achieve a lean-state operation in a first portion of the plurality of cylinders and a rich-state operation in a second portion of the plurality of cylinders.

9. The air-fuel ratio control system according to claim 8, wherein the operation control means for controlling, by means of the air-fuel ratio control means, air-fuel ratios in each of the respective cylinders so as to achieve, until the catalyst temperature determining means determines during a cold start of the internal combustion engine that the catalyst has reached the predetermined temperature, one of rich-state operation and stoichiometric operation in all of the cylinders and, when the catalyst temperature determination means determines that the exhaust emission control catalyst has reached the predetermined temperature, for starting, by means of the air-fuel ratio control means, lean-state operation a first portion of the plurality of cylinders and rich-state operation in a second portion of the plurality of cylinders.

10. An air-fuel ratio control method for a multi-cylinder internal combustion engine having a plurality of cylinders, comprising the steps of:

detecting a temperature of an exhaust emission control catalyst disposed in an exhaust passage of the internal combustion engine;

determining, during a cold start of the internal combustion engine, whether the temperature of the exhaust emission control catalyst has reached a first predetermined temperature; and performing an individual control of an air-fuel ratio in each of at least two of the internal combustion engine cylinders such that, if the temperature of the exhaust emission control catalyst is lower than the first predetermined temperature, an upper limit of the air-fuel ratio of at least one of the at least two cylinders is reduced relative to an upper limit of an air-fuel ratio in one of the other cylinders and in comparison with an upper limit of the air-fuel ratio of the at least one of the at least two cylinders used if the temperature of the exhaust emission control catalyst is equal to or higher than the first predetermined temperature.

11. The air-fuel ratio control method according to claim 10, wherein the first predetermined temperature is an activation start temperature at which an exhaust emission control reaction is started in the exhaust emission control catalyst.

12. The air-fuel ratio control method according to claim 10, wherein until the temperature of the exhaust emission control catalyst reaches the first predetermined temperature during a cold start of the internal combustion engine, the control step achieves one of rich-state operation and stoichiometric operation in all the cylinders, and wherein after the temperature of the exhaust emission control catalyst has exceeded the first predetermined temperature, the control step starts lean-state operation in a first portion of the plurality of cylinders, and starts rich-state operation in a second portion of the plurality of cylinders.

13. The air-fuel ratio control method according to claim 12, wherein the control step gradually increases the number of cylinders included in the first portion of the plurality of cylinders in accordance with an operational state of the internal combustion engine.

14. The air-fuel ratio control method according to claim 13, further comprising the step of:

determining whether the exhaust emission control catalyst temperature has reached a second predetermined temperature, wherein in the step of controlling the air fuel ratio, operation when the exhaust emission control catalyst reaches the second predetermined temperature, the number of cylinders included in the first portion of the plurality of cylinders is reduced.

15. The air-fuel ratio control method according to claim 14, wherein the second predetermined temperature is a temperature above which the exhaust emission control catalyst may become overheated and deteriorated in performance.

16. The air-fuel ratio control method according to claim 10, further comprising the step of:

correcting an amount of fuel injected into the second portion of the plurality of cylinders in accordance with an amount of air discharged from the first portion of the plurality of cylinders, so that an air-fuel ratio of exhaust gas discharged from the internal combustion engine and flowing into the exhaust emission control catalyst substantially maximizes a warm-up efficiency of the exhaust emission control catalyst.

\* \* \* \* \*